United States Patent [19]

Densow

[11] 3,938,622

[45] Feb. 17, 1976

[54] CHAIN SAW OIL PUMP WITH OVERLOAD PROTECTION

[75] Inventor: Ulrich O. Densow, Peterborough, Canada

[73] Assignee: Outboard Marine Corporation, Waukegan, Ill.

[22] Filed: Oct. 17, 1974

[21] Appl. No.: 515,668

[52] U.S. Cl. ............... 184/15 R; 30/123.4; 30/381; 83/169; 145/35 A; 184/32
[51] Int. Cl.² F16N 7/36; F16N 13/02; F16N 25/02; F16N 25/04
[58] Field of Search .............. 184/6.4, 32, 33, 15 R, 184/27 R, 27 E, 27 A, 27 B, 27 C, 27 D, 6.19; 30/123.4, 381; 83/169, 788; 145/35 A

[56] References Cited
UNITED STATES PATENTS

| | | | |
|---|---|---|---|
| 849,530 | 4/1907 | Clay | 184/27 A |
| 2,014,113 | 9/1935 | Morse | 184/37 |
| 2,650,626 | 9/1953 | Kiekhaefer | 184/15 R X |
| 3,068,961 | 12/1962 | Stihl et al | 184/33 X |
| 3,331,331 | 7/1967 | Irgens et al | 184/27 R X |
| 3,717,221 | 2/1973 | Densow | 184/6.4 |

FOREIGN PATENTS OR APPLICATIONS

| | | | |
|---|---|---|---|
| 141,338 | 5/1951 | Australia | 184/15 |
| 117,758 | 5/1930 | Austria | 184/32 |
| 885,306 | 8/1953 | Germany | 30/123.4 |
| 1,283,042 | 11/1968 | Germany | 184/27 R |

*Primary Examiner*—Richard C. Pinkham
*Assistant Examiner*—Arnold W. Kramer
*Attorney, Agent, or Firm*—Michael, Best & Friedrich

[57] ABSTRACT

Disclosed herein is a chain saw oil pump comprising an engine supported by a suitable frame, a pumping chamber defined by the frame and including an inlet and an outlet, a pumping member reciprocal and rotatable in said pumping chamber relative to the inlet and to the outlet so as to effect pumping operation incident to such reciprocation and rotation, and a spring biased gear for yieldably drivingly connecting the pumping member to the engine for rotation of the former in response to operation of the latter.

13 Claims, 10 Drawing Figures

U.S. Patent  Feb 17, 1976  3,938,622
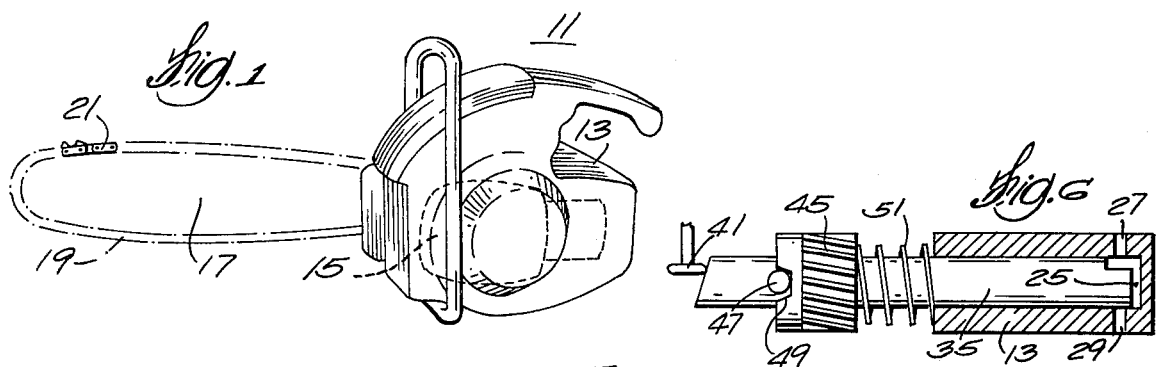
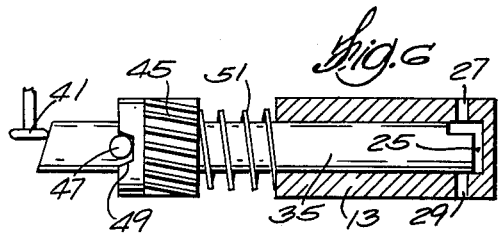
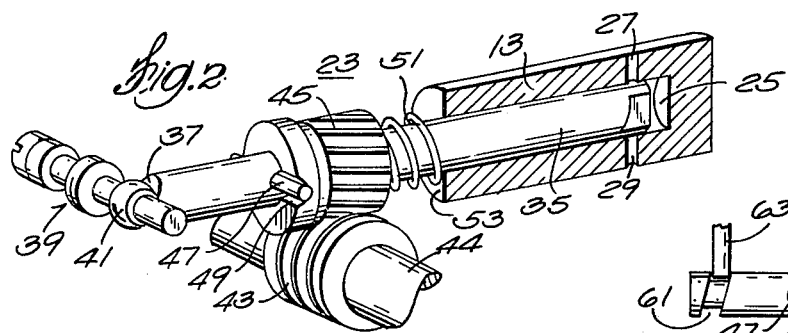
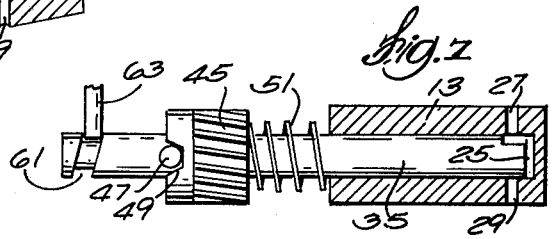
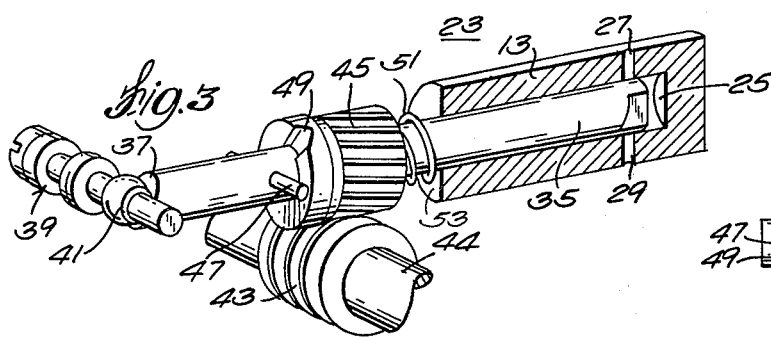
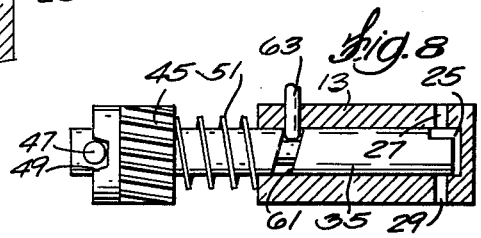
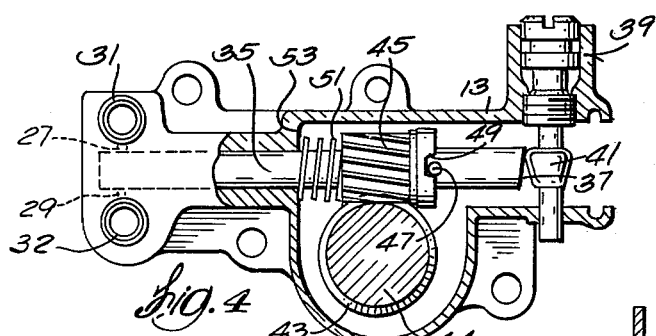
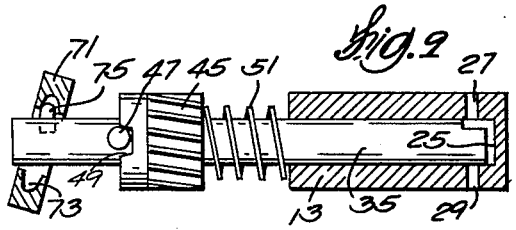
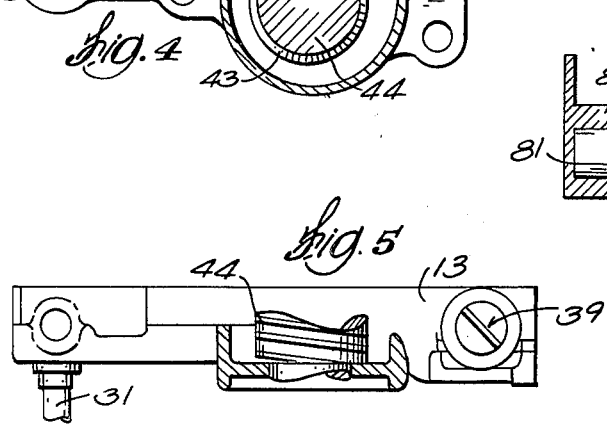
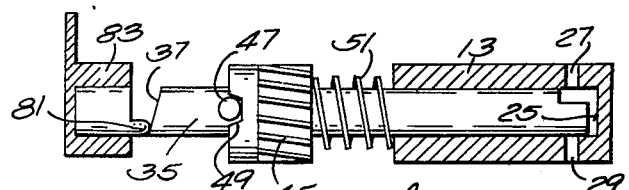

CHAIN SAW OIL PUMP WITH OVERLOAD PROTECTION

BACKGROUND OF THE INVENTION

The invention relates generally to chain saws and more particularly to oil pumps included in such chain saws.

In the past, the drive to the oil pump included in some prior chain saws has sometimes experienced severe wear because, at times, resistance to pumping operation was relatively high as for instance, during starting under cold weather conditions and because the drive from the engine to the pump was positive. The invention is directed toward reducing such wear.

One example of such prior constructions is disclosed in U.S. Densow Pat. No. 3,717,221 issued Feb. 20, 1973.

SUMMARY OF THE INVENTION

The invention provides a chain saw oil pump comprising an engine supported by a suitable frame, together with means on the frame defining a pumping chamber including an inlet and an outlet, and a pumping member rotatable in the pumping chamber relative to the inlet and outlet so as to effect pumping operation incident to such rotation, together with means for yieldably drivingly connecting the pumping member to the engine for rotation of the former in response to operation of the latter.

In one preferred embodiment in accordance with the invention, the means for yieldably drivingly connecting the pumping member to the engine includes a shaft rotatably supported by the frame and driven by the engine and including thereon a gear, together with a second gear meshed with the first gear and carried on the pumping member for rotary and axial movement relative thereto, and means for releasably drivingly connecting the second gear and the pumping member for common rotation.

In an embodiment in accordance with the invention, the means for releasably drivingly connecting the second gear to the pumping member comprises a projection on the pumping member, together with a notch formed in the gear and adapted to receive the projection so as to rotate the pumping member in response to rotation of the gear, and means for yieldably biasing together the projection and the notch.

Also in a preferred embodiment in accordance with the invention, the biasing means serves additionally to displace the pumping member in one axial direction as permitted by a cam which effects positive displacement of the pumping member in the other direction in response to rotation of the pumping member.

Also in accordance with the invention, there is provided an oil pump comprising wall means on a frame defining a pumping chamber including an inlet port and an outlet port, a pumping member rotatable in the pumping chamber relative to the inlet and outlet ports so as to effect pumping operation incident to such rotation, a drive shaft supported by the frame for rotation and having fixed thereon a first gear, a second gear meshed with the first gear for rotation thereof in response to first gear rotation and carried on the pumping member for rotary and axial movement relative thereto, and means for releasably drivingly connecting the second gear and the pumping member for common rotation.

One of the principal features of the invention is the provision of a chain saw including an oil pump and a releasable driving connection between the oil pump and an engine incorporated in the chain saw.

Another of the principal features of the invention is the provision of a chain saw oil pump in which means are provided to afford slippage in the drive to the oil pump in the event of resistance to pump operation above a predetermined level.

Another of the principal features of the invention is the provision of an oil pump which is particularly adapted for inclusion in a chain saw and which is driven by means for affording slippage in the event the resistance to pump operation is above a predetermined level.

Another principal feature of the invention is the provision of a chain saw which includes an oil pump and means for reducing the wear on the drive to the oil pump.

Other features and advantages of the invention will become known by reference to the following drawings, general description, and claims.

THE DRAWINGS

FIG. 1 is a perspective view of a chain saw incorporating various of the features of the invention.

FIG. 2 is an enlarged, fragmentary perspective and partially schematic view, with parts broken away and in section, of a lubricant pump incorporated in the chain saw shown in FIG. 1. In FIG. 2, the drive to the oil pump is shown in operative connection.

FIG. 3 is a view similar to FIG. 2 showing slippage in the drive to the oil pump.

FIG. 4 is an enlarged fragmentary view, partially broken away and in section, of the oil pump shown in FIGS. 2 and 3.

FIG. 5 is an elevational view, partially broken away and in section, of the construction shown in FIG. 4.

FIG. 6 is a schematic view of the construction shown in FIGS. 2 through 5.

FIG. 7 is a schematic view of another embodiment of a chain saw oil pump embodying various of the features of the invention.

FIG. 8 is a schematic view of still another embodiment of chain saw lubricant pump embodying various of the features of the invention.

FIG. 9 is a schematic view of still another embodiment of chain saw lubricant pump embodying various of the features of the invention.

FIG. 10 is a schematic view of still another embodiment of chain saw lubricant pump embodying various of the features of the invention.

GENERAL DESCRIPTION

Shown in the drawings is a chain saw 11 including a supporting frame 13 which can be of any suitable construction and which supports an engine 15 and a cutter bar 17 having a peripheral groove 19. The engine 15 drivingly rotates a drive sprocket (not shown) around which there is trained a chain 21 which travels in the peripheral groove 19 of the cutter bar 17.

Also included in the chain saw 11 and supported by the frame 13 is (See FIGS. 2 through 5) an oil or lubricant pump 23 which includes means on the frame 13 defining a pumping chamber 25 having spaced inlet and outlet ports 27 and 29 which respectively communicate (See FIG. 4) through a conduit 31 with a lubricant source (not shown) and through a discharge conduit 32 which delivers oil to the chain 21 and otherwise as may be appropriate. Also included in the lubricant pump 23 is a pumping piston or member 35 which is mounted by the frame 13 for rotary and reciprocal movement relative to the pumping chamber 25 so as to effect pumping of lubricant from the inlet port 27 into the chamber 25 and pumping of lubricant from the chamber 25 through the outlet port 29 and into the discharge conduit for delivery to the area to be lubricated.

Also included in the lubricant pump 23 is means for reciprocating the pumping member 35 in response to rotation thereof. While various arrangements can be employed, in the construction shown in FIGS. 2 through 5, such means includes inclusion of an inclined cam surface 37 on the outer end of the pumping member 35, together with a camming element 39 which is mounted by a portion of the frame 13 for axial movement in the direction radially of the rotary axis of the pumping member 35 and which includes thereon a cam 41 engagable with the cam surface 37 so as to effect reciprocation of the pumping member in response to rotation thereof.

Axial adjustment of the camming element 39 serves to adjust the stroke of the pumping member 35 so as to vary the output rate of the lubricant pump 23. As above described, the construction is generally conventional.

In accordance with the invention, means are provided for yieldably connecting the pumping member 35 to the engine 15 to effect rotation of the pumping member 35 in response to engine operation. In further accordance with the invention, such yieldable means comprises a first gear 43 fixed on a shaft 44 rotated by the engine 15, together with a second gear 45 in mesh with the first gear 43 and carried by the pumping member 35 for rotary and axial movement relative thereto, and means for yieldably or releasably connecting the second gear 45 to the pumping member 35 for common rotation.

In further accordance with the invention, the means for yieldably or releasably connecting the second gear 45 and the pumping member 35 for common rotation comprises a radial projection or pin 47 on the pumping member 35 and a radially extending notch 49 provided in one end face of the second gear 45 and adapted to receive the projection 47 so that rotation of the second gear 45 serves to rotate the pumping member 35. In addition, and also in accordance with the invention, the means for yieldably or releasably connecting the second gear 45 to the pumping member 35 includes spring means urging or biasing the second gear in the direction so as to engage the notch 49 around the projection 47.

In the construction shown in FIGS. 2 through 5, such biasing means comprises a helical spring 51 located in encirling relation to the pumping member 35 and engaged, at its ends, against one axial end of the second gear 45 and against a shoulder 53 formed on a portion of the supporting frame 13. Also in the disclosed construction, the spring 51 serves to maintain the cam surface 37 of the pumping member 35 in engagement with the cam 41 which serves to effect reciprocation of the pumping member 35 in response to pumping member rotation. Thus, in the construction shown in FIGS. 2 through 5, the pumping member 35 is positively displaced into the pumping chamber 25 by the cam 41 and is yieldably displaced outwardly of the pumping chamber 25 by the spring 51 as permitted by the cam 41.

Preferably, at least one of the side walls of the notch 49 is formed so as to present an inclined surface in engagement with the projection 47 so that, if resistance above a given level to rotation of the pumping member 35 is encountered, the second gear 45 will back off the projection 47 against the action of the spring 51 and will rotate without rotating the pumping member 35 until the resistance to pumping member rotation drops below the given level.

The invention contemplates various different arrangements for reciprocating the pumping member 35 in response to rotation thereof. In FIG. 6, the arrangement incorporated in the construction shown in FIGS. 2 through 5 is shown schematically. It is noted that axial movement of the camming element 39, including the cam 41, causes variation in the length of the stroke of the pumping member 35, whereby to afford adjustment of the rate of pump delivery. It is also noted that the spring 51 serves to bias the second gear 45 against the pin 47 and consequently to bias the surface 37 against the cam 41.

Shown in FIG. 7 is an arrangement for axially displacing the pumping member 35 in response to pumping member rotation, which arrangement is positive in actuation and comprises an annular groove 61 which is formed in the pumping member 35 and which is inclined to a plane perpendicular to the axis of pumping member rotation and which receives an element 63 fixed relative to the supporting frame 13. Thus, in the construction shown in FIG. 7, reciprocation of the pumping member 35 is positively provided in both directions in response to rotation of the pumping member 35 and the spring 51 serves solely to maintain the gear 45 in driving engagement with the projection 47 not withstanding positive reciprocation of the pumping member 35.

Shown in FIG. 8 is another arrangement for positively axially displacing the pumping member in response to pumping member rotation, which arrangement is essentially the same as shown in FIG. 7 except that the groove 61 and element 63 are located between the pumping chamber 25 and the gear 45 as compared to the arrangement shown in FIG. 7 in which the groove 61 and element 63 are located on the far side of the gear 45 from the pumping chamber 25.

Shown in FIG. 9 is still another arrangement for positively axially displacing the pumping member 35 in both directions in response to pumping member rotation, which arrangement includes an annular collar 71 which encircles the pumping member 35, which includes an annular groove 73 receiving an element 75 extending fixedly from the pumping member 35, and which can be adjusted angularly so as to vary the stroke of the pumping member 35 and thereby to also adjust the pumping rate. As in the embodiments shown in FIGS. 7 and 8, the pumping member 35 is positively displaced in both axial directions by the collar 71 to provide reciprocation, and the spring 51 serves solely to maintain driving engagement of the projection 47 by the notch 49. A more complete description of the basic construction of the arrangement shown in FIG. 9 is provided in the before mentioned U.S. Densow Pat. No. 3,717,221, issued Feb. 20, 1973.

Shown in FIG. 10 is still another arrangement for axially displacing the pumping member 35 in response to pumping member rotation, which arrangement includes an inclined cam surface 37 at the end of the pumping member 35 as shown in FIGS. 2 through 6. In addition, a cam 81 is provided on a member 83 which is adjustably mounted for selective angular positioning about the rotary axis of the pumping member 35, whereby to cause a change in time of suction and delivery without change in the rate of oil delivery. As in the construction shown in FIGS. 2 through 6, the spring 51 also serves to retain the cam surface 37 in engagement with the cam 81.

In operation of all of the embodiments, whenever the resistance to pumping exceeds a predetermined level, rotation of the gear 43 combined with consequent rotation of the gear 45 and the camming action of the pin 47 with the inclined surface of the notch 49 will serve to displace the gear 45 axially of the pumping member 35 against the action of the spring 51 so as to withdraw the notch 49 from the pin 47 and to permit rotary movement or slippage of the gear 45 relative to the pumping member 35 and thereby to reduce wear on the gears 43 and 45. Whenever resistance to pumping operation falls below the predetermined level, the spring 51 will displace the gear 45 to the left as shown in FIG. 2 so as to receive the projection 47 in the notch and thereby to provide for rotation of the pumping member 35 and consequent pumping operation in response to rotation of the gear 45.

Various of the features of the invention are set forth in the following claims:

What is claimed is:

1. A chain saw comprising a frame, an engine supported by said frame, wall means on said frame defining a pumping chamber including an inlet port and an outlet port, a pumping member rotatable in said pumping chamber relative to said inlet and outlet ports so as to effect pumping operation incident to such rotation, a shaft rotatably supported by said frame and driven by said engine and including thereon a first gear, a second gear meshed with said first gear for rotation thereof in response to first gear rotation and carried for rotary and axial movement relative to said pumping member, a projection radially extending from said pumping member, a notch formed on said second gear and adapted to releasably receive said projection so as to effect rotary driving of said pumping member by said second gear in response to engagement of said projection in said notch, and means in addition to said second gear and said projection yieldably biasing one of said second gear and said projection toward the other.

2. A chain saw in accordance with claim 1 and including means for reciprocating said pumping member in response to rotation thereof.

3. A chain saw in accordance with claim 2 wherein said means for reciprocating said pumping member in response to rotation thereof includes means engaged with said pumping member for positively displacing said pumping member in one axial direction in response to pumping member rotation, and means for yieldably displacing said pumping member in the opposite axial direction comprising said means yieldably biasing one of said second gear and said projection.

4. A chain saw in accordance with claim 1 wherein said notch has at least one inclined side wall.

5. A chain saw in accordance with claim 1 wherein said second gear is carried coaxially with said pumping member and wherein said yieldable biasing means comprises a helical spring encircling said pumping member and bearing between said frame and said second gear.

6. A chain saw in accordance with claim 5 and further including means for reciprocating said pumping member in response to rotation thereof including means engaged with said pumping member for positively displacing said pumping member in one axial direction in response to pumping member rotation and said helical spring which yieldably displaces said pumping member in the opposite axial direction through engagement between said second gear and said projection.

7. An oil pump comprising a frame, wall means on said frame defining a pumping chamber including an inlet port and an outlet port, a pumping member rotatable in said pumping chamber relative to said inlet and outlet ports so as to effect pumping operation incident to such rotation, a drive shaft supported by said frame for rotation and having fixed thereon a first gear, a second gear meshed with said first gear for rotation thereof in response to first gear rotation and carried for rotary and axial movement relative to said pumping member, a projection radially extending from said pumping member, a notch formed on said second gear and adapted to releasably receive said projection so as to effect rotary driving of said pumping member by said second gear in response to engagement of said projection in said notch, and means in addition to said second gear and said projection yieldably biasing one of said second gear and said projection toward the other.

8. An oil pump in accordance with claim 7 and including means for reciprocating said pumping member in response to rotation thereof.

9. An oil pump in accordance with claim 8 wherein said means for reciprocating said pumping member in response to rotation thereof includes means engaged with said pumping member for positively displacing said pumping member in one axial direction in response to pumping member rotation, and means for yieldably displacing said pumping member in the opposite axial direction comprising said means yieldably biasing one of said second gear and said projection.

10. An oil pump in accordance with claim 7 wherein said notch has at least one inclined side wall.

11. An oil pump in accordance with claim 7 wherein said second gear is carried coaxially with said pumping member and wherein said yieldable biasing means comprises a helical spring encirling said pumping member and bearing between said frame and said second gear.

12. An oil pump in accordance with claim 11 and further including means for reciprocating said pumping member in response to rotation thereof, and including means engaged with said pumping member for positively displacing said pumping member in one axial direction in response to pumping member roation and said helical spring which yieldably displaces said pumping member in the opposite axial direction through engagement betweeen said second gear and said projection.

13. An oil pump comprising a frame, wall means on said frame defining a pumping chamber including an inlet port and an outlet port, a pumping member rotatable in said pumping chamber relative to said inlet and outlet ports so as to effect pumping operation incident to such rotation, a drive shaft supported by said frame for rotation and having fixed thereon a first gear, a second gear meshed with said first gear for rotation thereof in response to first gear rotation, said second gear being carried for rotary and axial movement relative to said pumping member, parts on said pumping member and on said gear located for releasable direct interengagement to effect driving rotation of said pumping member by said second gear, and means separate from said interengaging parts for yieldably biasing one of said second gear and said pumping member toward the other to releasably interengage said parts.

* * * * *